United States Patent [19]

Bergman et al.

[11] Patent Number: 4,577,326
[45] Date of Patent: Mar. 18, 1986

[54] DC ARC FURNACE HEARTH CONNECTION

[75] Inventors: Kjell Bergman; Sven-Einar Stenkvist, both of Västerås, Sweden

[73] Assignee: ASEA Aktiebolag, Västerås, Sweden

[21] Appl. No.: 622,589

[22] Filed: Jun. 20, 1984

[30] Foreign Application Priority Data

Jul. 7, 1983 [SE] Sweden ................. 8303879

[51] Int. Cl.⁴ ............................................. H05B 7/11
[52] U.S. Cl. .................................. 373/103; 373/108
[58] Field of Search ............... 373/71, 72, 108, 62, 373/64, 101, 103, 107

[56] References Cited

U.S. PATENT DOCUMENTS

| | | | |
|---|---|---|---|
| 984,590 | 2/1911 | Nau | 373/72 |
| 2,789,150 | 4/1957 | Clough et al. | 373/64 |
| 4,079,185 | 3/1978 | Collin | 373/108 |
| 4,356,340 | 10/1982 | Stenkvist | 373/108 |
| 4,403,328 | 9/1983 | Lassander et al. | 373/103 |
| 4,468,782 | 8/1984 | Stenkvist | 373/108 |

Primary Examiner—Roy N. Envall, Jr.
Attorney, Agent, or Firm—Kenyon & Kenyon

[57] ABSTRACT

A DC arc furnace having a vertical arcing electrode adapted to be connected with a negative current lead and a hearth adapted to contain a melt below the electrode and having a hearth electrode, the hearth electrode extending laterally from the axis of the arcing electrode symmetrically with respect to the axis and having a plurality of electrical connections extending to the outside of the hearth and spaced laterally from the arcing electrode's axis symmetrically with respect to the axis, the connections being adapted for connection with a positive current lead and application of DC to the electrodes powering an arc between the arcing electrode and melt; wherein the improvement comprises a positive current lead below the bottom of the hearth and having an upper end positioned on the arcing electrode's axis below the hearth's bottom and extending from the positive current lead's upper end vertically downwardly on the axis to a low position where the magnetic field of the positive current lead cannot appreciably affect the arc, the positive current lead extending substantially horizontally from its low position offset from the hearth, the positive current lead's upper end having electrical conductors extending from it to the electrical connections of the hearth electrode and which are symmetrical with respect to the arcing electrode's axis.

2 Claims, 1 Drawing Figure

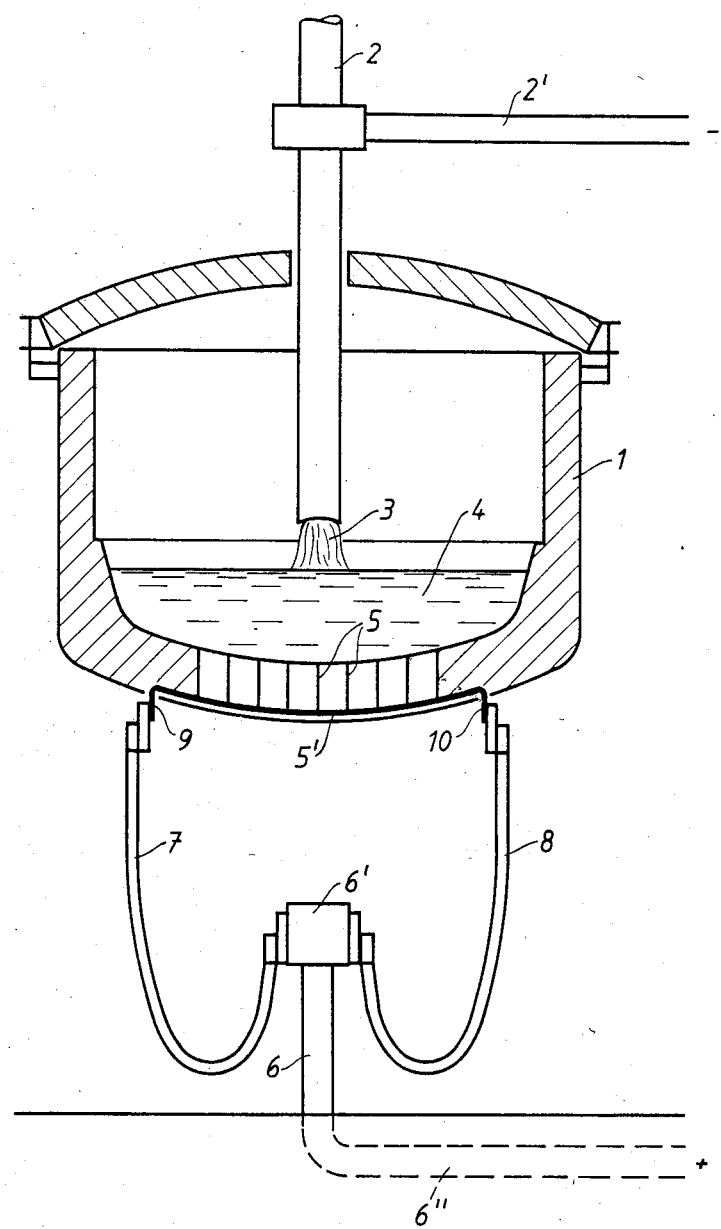

DC ARC FURNACE HEARTH CONNECTION

A conventional DC arc furnace has at least one vertical arcing electrode adapted to be connected with a negative current lead and a hearth adapted to contain a melt below the electrode and having a hearth electrode adapted to be connected with a positive current lead.

One form of hearth electrode is described by the Stenkvist U.S. Pat. No. 4,228,314. In this form the hearth electrode extends laterally from the axis of the arcing electrode symmetrically with respect to the axis and has at least two electric connections on the outside of the hearth and spaced laterally from the arcing electrode's axis symmetrically with respect to the axis. These connections are adapted for connecting with the positive current lead. Application of DC to the electrodes powers an arc between the arcing electrode and melt for heating the latter.

In the patent to provide the hearth electrode the hearth is made of refractory material through which vertical metal conductors extend in the form of a circular cluster arranged symmetrically with respect to the arcing electrode's axis, the conductor's upper ends connecting with the melt and their lower ends being electrically connected with a metal plate which is at least coextensive with the cluster of conductors and has the electric connections on the outside of the hearth because they extend from the metal plate downwardly through the furnace bottom so as to be externally accessible for connection with the positive current lead. These electric connections are spaced at equal distances from the axis of the arcing electrode so they are symmetrical with respect to that axis. If more than two electric connections are used they should also by symmetrically arranged with respect to the arcing electrode's s axis.

Because of the symmetry of the parts carrying electric current it would seem that the arc between the arcing electrode and the melt should burn in alignment with the arcing electrode's axis. However, when this Stenkvist patent furnace was put in full scale operation it was found that the arc burned angularly, throwing this arc flare destructively against the side wall lining of the furnace.

In practical operation the DC is fed to the current leads from a transformer room horizontally offset from the furnace and it was believed that the magnetic field from one or both of these leads caused the angular arc deflection. The negative current lead to the arcing electrode is in the form of a horizontal electrode arm positioned at a substantial height above the arc and its magnetic field should have little effect on the arc. It is the positive current lead to the hearth electrode that is responsible for the problem of arc deflection.

Various efforts have been made to solve the above problem. For example, the Lassander U.S. Pat. No. 4,403,328 provides one solution but involves a somewhat complicated arrangement of the current leads. A simpler solution to the problem is desirable.

Briefly summarized, the present invention provides a simpler solution by using a positive current lead below the bottom of the hearth and having an upper end positioned on the arcing electrode's axis relatively closely below the hearth bottom, this positive current lead extending from its upper end vertically downward on the arcing electrode's axis to a low position where the magnetic field of the positive current lead cannot appreciably affect the arc. This low position can be determined by technical analysis of the factors involved or by actual experimentation. From this low position the positive current lead can then extend horizontally to the transformer room without its magnetic field affecting the arc.

The positive current lead's upper end is connected to the hearth electrode's electrical connections on the outside of the hearth by means of flexible electric conductor cables which branch from the upper end of the positive current lead to those connections. As previously mentioned, those electrical connections are spaced laterally from the electrode's axis symmetrical with respect to the axis. By making the flexible cables of equal lengths which depend from the hearth electrode connections to the positive current lead's upper end, their magnetic fields cancel out and have no effect on the arc.

To keep the vertical leg of the positive current lead as precisely as possible on the axis of the arcing electrode, requires this leg to be rigidly positioned. The symmetrically disposed flexible cables should be long enough to permit the furnace to be tilted or rocked as required for it to be conventionally tapped. All parts carrying the positive current to the symmetrically disposed hearth electrode via its symmetrically disposed electrical connections are symmetrically arranged relative to the arcing electrode's axis as required to prevent arc deviation or angularity, and this is done in a simpler manner relative to all known previous proposals.

The foregoing is illustrated by the single figure of the accompanying drawing which schematically in vertical section is adequate for the illustration.

In this drawing the furnace 1 is shown with in this case a single vertical arcing electrode 2 depending from what can be the usual horizontal electrode arm 2', the tip of the electrode forming an arc 3 with a melt 4 in the furnace hearth. The hearth is shown with the cluster of vertical conductors 5 extending through its refractory, their upper ends being in contact with the melt 4 and their lower ends being in electrical connection with an electrically conductive metal plate 5'. These parts are intended to schematically illustrate the electrically conductive hearth or hearth electrode of the previously mentioned Stenkvist patent.

In accord with the principles of the present invention the positive current lead is shown with its vertical leg 6 depending from its upper end 6' downwardly to its horizontal part 6" positioned far enough below the bottom of the furnace to avoid its magnetic field from having any appreciable effect on the desired vertical burning of the arc 3. The upper end 6' is relatively close to the bottom of the furnace and its hearth. The flexible cables 7 and 8 connect the positive current lead's upper end 6' with the electrical connections, or terminals 9 and 10 of the conductive metal plate 5' of the furnace hearth. This upper end 6' can be positioned as close to the furnace as is consistent with the ability of the flexible cables 7 and 8 to permit tilting or rocking of the furnace 1.

The cluster of conductors 5 providing the hearth electrode, are positioned as a circular group symmetrical with the axis of the arcing electrode 2, the electrically conductive metal plate 5' is also circular and symmetrical with respect to that axis and the vertical leg 6 of the positive current lead is also on that axis. Further, the electric connections 9 and 10 of the plate 5' are also symmetrical with that axis, being spaced equally on both sides of the axis. Therefore, with the flexible cables 7 and 8 of equal lengths they form suspended loops which are likewise symmetrical with respect to the arcing electrode's axis. Because the horizontal part 6" of the positive current lead is positioned so far below the furnace bottom its magnetic field can have no effect on the arc 3 it can extend as far as necessary to reach the DC power source normally in a transformer room horizontally offset from the furnace. It follows that arc deflection or angularity is avoided by a construction that is simpler than has heretofore been available.

What is claimed is:

1. A DC arc furnace having a vertical arcing electrode adapted to be connected with a negative current lead and a hearth adapted to contain a melt below the electrode and having a hearth electrode comprising a plurality of vertical metal conductors extending through the hearth in the form of a cluster, the hearth electrode extending laterally from the axis of the arcing electrode symmetrically with respect to the axis and having a plurality of electrical connections extending to the outside of the hearth and spaced laterally from the arcing electrode's axis symmetrically with respect to the axis, the connections being adapted for connection with a positive current lead and application of DC to the electrodes powering an arc between the arcing electrode and melt; wherein the improvement comprises a positive current lead below the bottom of the hearth and having an upper end positioned on the arcing electrode's axis below the hearth's bottom and extending from the positive current lead's upper end vertically downwardly on the axis to a low position where the magnetic field of the positive current lead cannot appreciably affect the arc, the positive current lead extending substantially horizontally from its low position to a position offset from the hearth, the positive current lead's upper end having electrical conductors extending from it to the electrical connections of the hearth electrode and which are symmetrical with respect to the arcing electrode's axis.

2. The furnace of claim 1 in which said electrical conductors are in the form of flexible cables of equal lengths and which form suspended loops which permit movement of the furnace relative to the upper end of the positive current lead.

* * * * *